United States Patent [19]

Pacey et al.

[11] 4,254,865
[45] Mar. 10, 1981

[54] PROTECTIVE PACKAGE FOR AN OPTICAL FIBER SPLICE

[75] Inventors: Grant K. Pacey, Nepean; Ronald F. Hughes, Ottawa; William P. Trumble, Kanata; Helmut H. Lukas, Ontario, all of Canada

[73] Assignee: Northern Telecom Limited, Montreal, Canada

[21] Appl. No.: 81,204

[22] Filed: Oct. 2, 1979

[51] Int. Cl.³ .................. G02B 5/15; B65D 85/20; B65D 85/38
[52] U.S. Cl. .................. 206/316; 206/460; 206/813; 220/4 E; 220/339; 350/96.21
[58] Field of Search .............. 206/316, 820, 460, 223, 206/813; 220/4 E, 339; 350/96.21; 229/485 B

[56] References Cited

U.S. PATENT DOCUMENTS

| | | | |
|---|---|---|---|
| 2,744,624 | 5/1956 | Hoogstoel et al. | 229/485 B |
| 3,082,866 | 3/1963 | Kessman | 206/813 |
| 4,029,390 | 6/1977 | Chinnock et al. | 350/96.21 |
| 4,109,369 | 8/1978 | Taylor | 350/96.21 |

*Primary Examiner*—William T. Dixson, Jr.
*Attorney, Agent, or Firm*—Sidney T. Jelly

[57] ABSTRACT

A protective package for an optical fiber splice comprises two elongate plastic members, each having a layer of pressure sensitive adhesive on a front face. Elongate grooves are formed at each end of each member. The grooves are dimensioned so as to be a close fit over the uncoated portions of spliced fibers and intervening adhesive material, with the members in face-to-face assembly. The members may be hingedly connected by the adhesive layer or by a thin deformable hinge portion. A further groove may connect the end grooves, being of a dimension to fit firmly over the uncoated end portions of spliced fibers.

14 Claims, 11 Drawing Figures

PROTECTIVE PACKAGE FOR AN OPTICAL FIBER SPLICE

This invention relates to a protective package for an optical fiber splice. In particular it relates to a self-contained package which is readily applied, with little or no preparation at the time of application.

The splicing of optical fiber pairs in end-to-end axial alignment by fusion, enclosing in a sleeve and other techniques is now widely accepted. However the splice should be protected by a suitable packaging which will provide structural and environmental protection during handling and service.

It has been proposed to cover the splice by a heat shrink tube, but the tube must be positioned over one fiber prior to splicing, a heat source of correct characteristics is necessary and the tube is very flexible.

The present invention provides a protective package which provides structural rigidity, seals the bare fiber from external influences and is self-contained, using a pressure sensitive adhesive.

Broadly, the protective package comprises two elongate plastic material members and a layer of pressure sensitive adhesive on front faces of the plastic members, whereby on laying a fiber splice on one member, on the adhesive material, the other member is applied, front face to front face, and the members adhere to each other around the splice. The members can be hingedly joined side by side by the layer of adhesive material, or a hinge can be provided. Locking means on one or both members can be provided. Several pairs of spliced fibers can be positioned side by side in one pair of members. Grooves are provided at each end of each member to accept a coated portion of each fiber. If desired a narrow groove can be provided at the center portion of each member to accept the uncoated spliced ends of the fibers.

The invention will be readily understood by the following description of certain embodiments by way of example, in conjunction with the accompanying drawings, in which.

Figure 1:
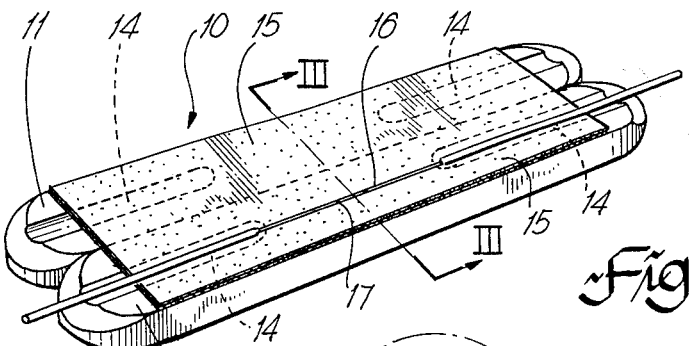
FIG. 1 is a perpective view of one form of package with an optical fiber splice in position.
Figure 2:
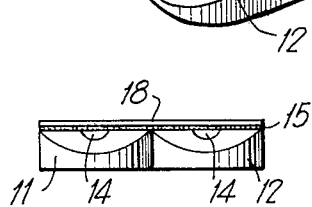
FIG. 2 is an end view of a package as illustrated in FIG. 1, the members hinged together by the adhesive layer.

FIGS. 1 and 2 illustrate the general concept of a package in accordance with the invention. The package, indicated generally at 10, comprises two plastic members 11 and 12, elongate in plan form. Each member has a longitudinal groove 14 at each end. Covering the two members, on their front faces, is a layer of pressure sensitive adhesive 15. On one member 11, is positioned a spliced pair of fibers 16 and 17. The fiber ends are bare, on either side of the splice, the coated portions of the fibers positioned over the grooves 14. The grooves 14 may be of such dimensions as to be a fairly firm fit on the coated fibers, over the layer of adhesive, although the grooves can be larger. The grooves 14 preferably are such as will ensure a seal around the coated fibers. Prior to positioning the spliced fibers 16 and 17 on one of the members 11, 12, a protective cover or backing is removed from the adhesive layer 15 to expose the adhesive. After positioning the spliced fibers on one of the members, the two members are pressed together, face to face, the adhesive layer bonding the two members together.

Figure 3:
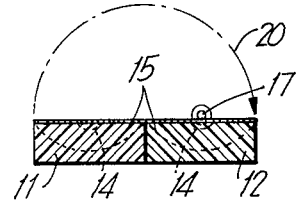
FIG. 3 is a cross-section on the line III—III of FIG. 1.

FIG. 2 illustrates one embodiment as in FIG. 1, illustrating the two members 11 and 12, adhesive layer 15 and protective cover or backing 18. The two members are connected together by the adhesive layer 15 and the cover 18. FIG. 3 illustrates the use of the package of FIG. 2. The protective cover 18 has been removed, exposing the pressure sensititve adhesive layer 15. A spliced pair of fibers is placed on the layer 15, the coated portions of the fibers over the grooves 14 in one member 12 in FIG. 3. Member 11 is then pivotted over, as indicated by the arrow 20. The final package is illustrated in FIG. 4.

Figure 4:
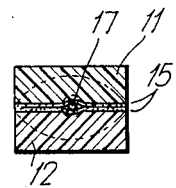
FIG. 4 is a cross-section as in FIG. 3, with the package in a closed condition.

In the embodiment as illustrated in FIG. 1, and in FIGS. 2, 3, and 4, the connection of the two members 11 and 12 is by the adhesive layer 15. A suitable adhesive is a modified acrylic adhesive such as is sold by National Starch under the name "Tackmaster". A typical thickness for the adhesive layer is about 0.005". Other adhesives can be used, and the thickness can vary. The package is prepared by positioning two members side-by-side and the pressure adhesive layer 15 and backing or cover 18 is applied to the front faces of the members. This holds the members together. As described, the protective backing or cover 18 is removed prior to positioning of the spliced fibers. The adhesive layers are compressed by the bare ends of the fibers 16 and 17, which are closely held in the center sections of the members 11 and 12, while the coated portions are more loosely held in the grooves at the end sections.

The package is extremely easy to use. The previously assembled members can be supplied ready to use and all the user has to do after the fibers have been spliced is to remove the protective cover or backing and, in effect, fold the package about the splice, pressing the two members firmly together for a completed packaging.

Figure 5:
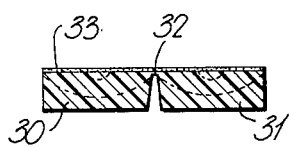
FIG. 5 is a cross-section similar to that of FIG. 3 illustrating a package with the members connected by a plastic hinge.
Figure 6:
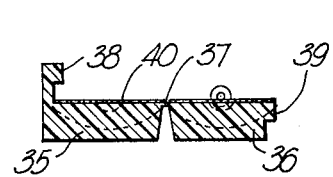
FIG. 6 is a cross-section, similar to that of FIG. 3, of a package with the members connected by a plastic hinge, and with locking means.
Figure 7:
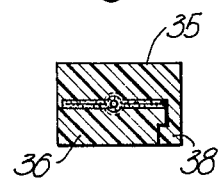
FIG. 7 is a transverse cross-section of the package of FIG. 6 in a closed condition.

An alternative embodiment is illustrated in FIG. 5. In this embodiment, two plastic members 30 and 31 are connected by a hinge formed by a thin section 32. The protective cover or backing is not shown in FIG. 9, spliced fibers being in position prior to closing the two members together. The layer of pressure sensititve adhesive 33 need not, in this example be such that it has enough strength to hold the two members together and act as a hinge. FIG. 6 illustrates an embodiment in which two members 35 and 36 are connected by a thin portion 37 which acts as a hinge, and one of the members 35, has a hooked member 38 extending upward from the front face. When member 35 is hinged over onto member 36, the hooked member engages over a rib 39 along the edge of member 36, as seen in FIG. 7. The adhesive layer is seen at 40.

Figure 8:
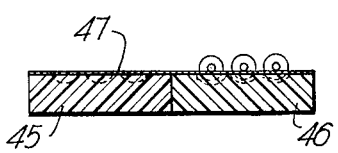
FIG. 8 is a transverse cross-section of a multiple splice package.

FIG. 8 illustrates an embodiment for packaging a multiple of fiber pairs. In the particular example, the package is for three pairs but it will be appreciated that the number can vary. In this example, the members 45 and 46 are connected by the adhesive layer 47, but a hinge can be provided by a thin portion, as in FIGS. 5, 6 and 7.

Figure 9:
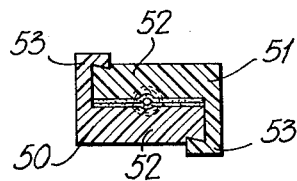
FIG. 9 is a transverse cross-section of a package using two separate members, interlocking.

FIG. 9 illustrates an embodiment in which two members 50 and 51 are used. The two members are, in the example, of the same form, each member having a body portion 52 with a hook shaped member 53 extending upward normal to the front face. A layer of pressure sensitive adhesive 54 is on the front face of each member. Prior to use a protective cover or backing is positioned on the adhesive layer, but in FIG. 9 the protective cover has been removed and the two members closed over a spliced pair of fibers. The hook shaped members 53 interlock over the main body portions of the members.

Figure 10:
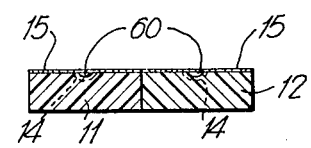
FIG. 10 is a cross-section similar to FIG. 3 and illustrates a modified form of the package illustrated in FIGS. 1, 2 and 3.
Figure 11:
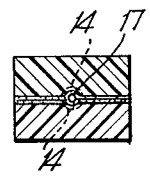
FIG. 11 is a cross-section, as in FIG. 10, with the package closed about a pair of spliced fibers.

FIGS. 10 and 11 illustrate a modification of the embodiment illustrated in FIGS. 1 to 4, in which a small groove 60 is provided for the center section of each member. Such a groove extends between the grooves 14 and is of a dimension such that the adhesive may be slightly compressed when the package is closed, gripping the bare fiber ends. Such an arrangement may have advantages for some adhesives. The provision of a groove 60, as illustrated in FIGS. 10 and 11, can be applied to all of the various package forms described above.

What is claimed is:

1. A protective package for enclosing and protecting a fusion spliced pair of optical fibers, each fiber having an uncoated portion immediately adjacent to the splice and a coated portion spaced from the splice, the package comprising:
   two elongate plastic members each having a front face;
   an elongate groove in each front face at each end of each member;
   a layer of pressure sensitive adhesive material extending over each said front face of each member and overlying said grooves;
   the elongate grooves of a cross-section such that the grooves fit closely over said coated portions of said fibers, when said members are in face to face assembly, the adhesive material in contact with the coated portions of fibers in the grooves and in contact with the uncoated portions of the fibers adjacent to the fusion splice.

2. A package as claimed in claim 1, said pressure sensitive adhesive material extending across both members and hingedly connecting said members.

3. A package as claimed in claim 1, including a protective cover on said pressure sensitive material.

4. A package as claimed in claim 1, said members connected at contiguous edges by a thin, deformable, portion, said deformable portion forming a hinge.

5. A package as claimed in claim 1, including a hooked member extending from one member, said hooked member engaging over the other member when in face-to-face assembly.

6. A package as claimed in claim 1, including a plurality of grooves at each end of each member, said grooves spaced apart laterally, for the reception of a plurality of spliced pairs of fibers in spaced apart side-by-side relationship.

7. A package as claimed in claim 4, each member having a hook shaped member extending from said face, the hook shaped members being on opposite sides of the package in a face-to-face assembly and engaging over the opposed member.

8. A package as claimed in claim 1, including a further groove in each member, said further groove connecting said elongate grooves at each end of each member, said further grooves each of a cross-sectional dimension to be a close fit over the uncoated portions of the spliced fibers and intervening adhesive material.

9. A packaged optical fiber splice comprising:
   at least one pair of fusion spliced optical fibers in axial end-to-end alignment, each of said fibers having an uncoated portion immediately adjacent to the splice and a coated portion spaced from the splice;
   two elongate plastic members in face-to-face assembly, said fibers positioned between said members;
   a layer of pressure sensitive adhesive material on the face of each member, the adhesive material retaining the members in said face-to-face assembly;
   each of said members having an elongate groove at each end, the grooves of a cross-sectional dimension such that they fit closely over the coated portions of said fibers and intervening adhesive material, said adhesive material also in contact with said uncoated portions of said fibers.

10. A packaged optical fiber splice as claimed in claim 9, said plastic members hingedly connected along contiguous edges by a thin deformable hinge portion.

11. A packaged optical fiber splice as claimed in claim 9, at least one of said members having a hook-shaped extension engaging over the other member.

12. A packaged optical fiber splice as claimed in claim 9, each said member having a further groove connecting said elongate grooves, said further grooves being a close fit over uncoated portions of said fibers and intervening adhesive material.

13. A packaged optical fiber splice as claimed in claim 9, comprising a plurality of pairs of spliced optical fibers in axial end-to-end relationship, said elongate members each having a plurality of elongate grooves at each end corresponding to said plurality of pairs of spliced optical fibers.

14. A protective package as claimed in claim 1, said adhesive material being a modified acrylic adhesive material.

* * * * *